W. P. TINSLEY.
MILK AGITATOR.
APPLICATION FILED AUG. 21, 1912.
1,045,913.
Patented Dec. 3, 1912.
2 SHEETS—SHEET 1.
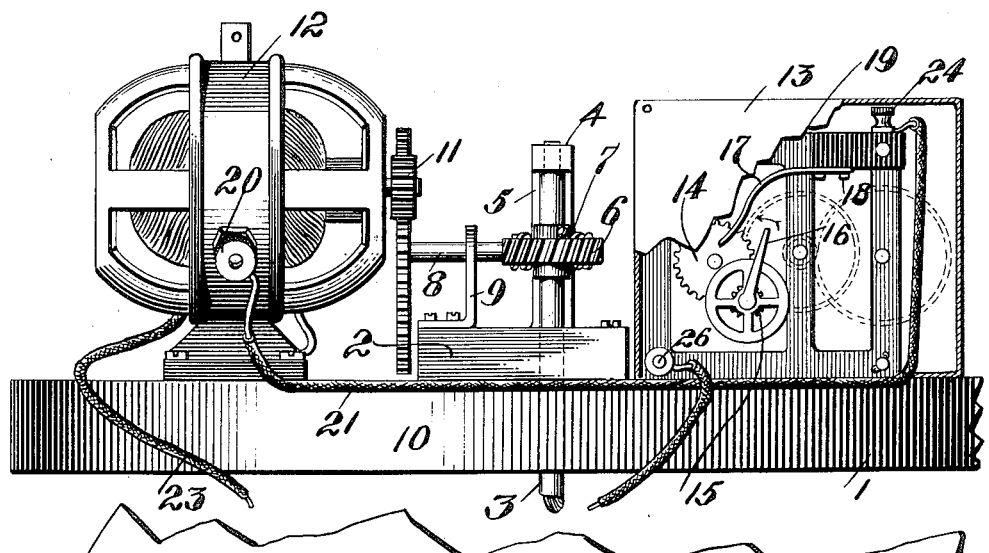
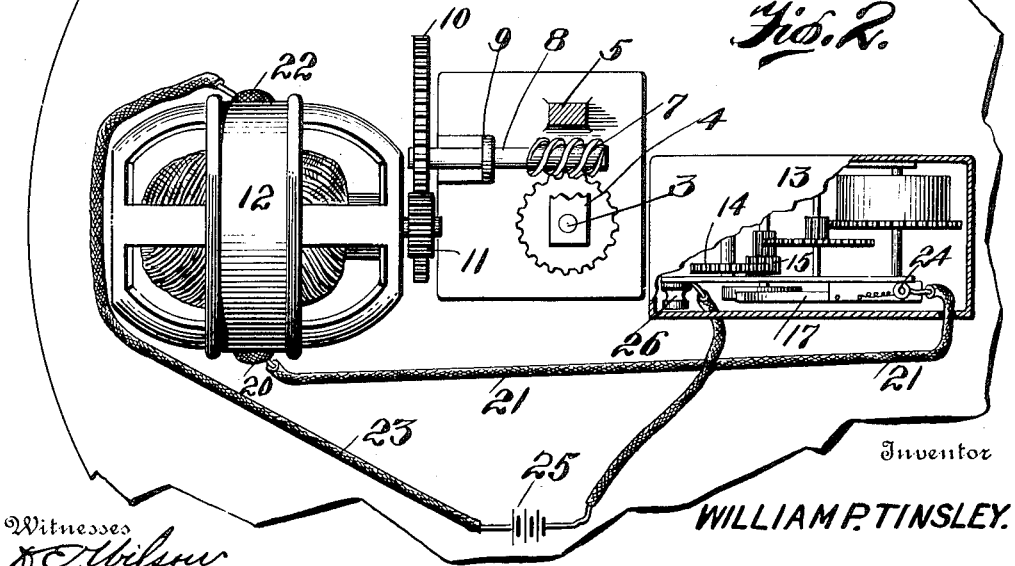
WILLIAM P. TINSLEY.

W. P. TINSLEY.
MILK AGITATOR.
APPLICATION FILED AUG. 21, 1912.
1,045,913.
Patented Dec. 3, 1912.
2 SHEETS—SHEET 2.
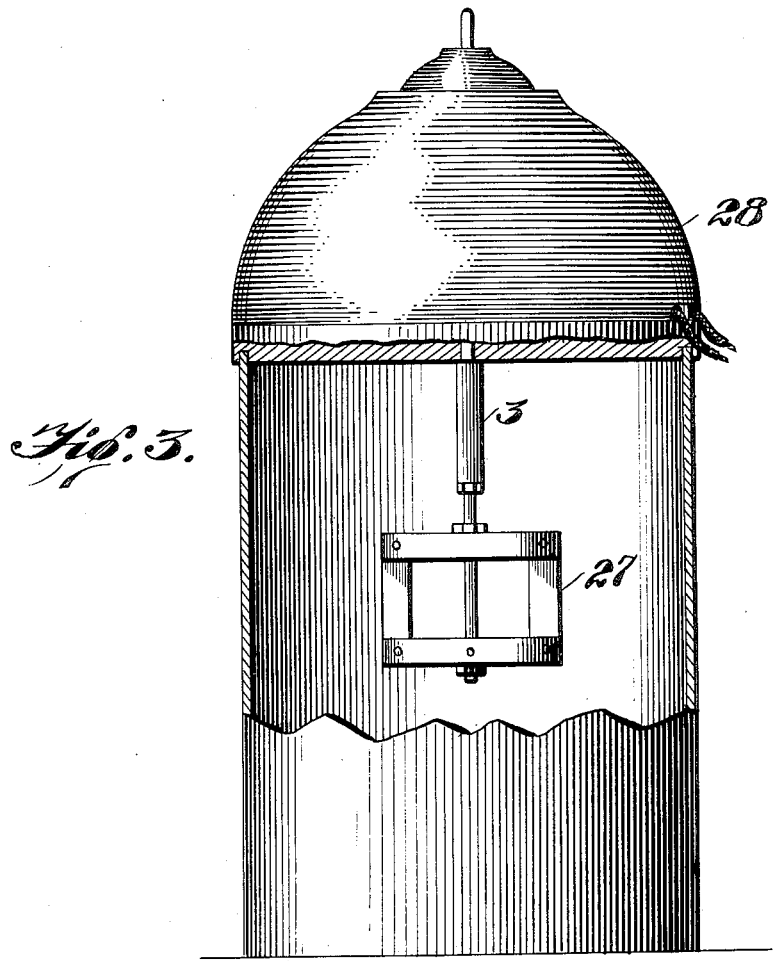
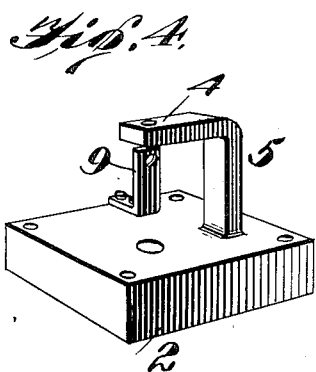
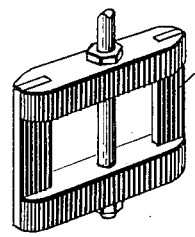
Witnesses
D. C. Wilson
A. S. Porto
Inventor
WILLIAM P. TINSLEY.
By William T. Ioms
Attorney

UNITED STATES PATENT OFFICE.

WILLIAM PIERCE TINSLEY, OF BEECHER CITY, ILLINOIS.

MILK-AGITATOR.

1,045,913. Specification of Letters Patent. Patented Dec. 3, 1912.

Application filed August 21, 1912. Serial No. 716,303.

*To all whom it may concern:*

Be it known that I, WILLIAM P. TINSLEY, a citizen of the United States, residing at Beecher City, in the county of Effingham and State of Illinois, have invented certain new and useful Improvements in Milk-Agitators, of which the following is a specification.

My invention relates to an agitator for fluid, and is particularly designed for the purpose of insuring at all times a thorough mixing of milk and cream.

In restaurants and similar places where milk is served it is quite common to keep the same in a can or similar vessel provided with a faucet at its bottom. It follows a short time subsequent to the pouring in of the milk into the can that the cream will naturally rise to the top of the vessel, so that the customers who first order milk, as a matter of fact, secure milk only, while those who desire the same food are furnished with pure cream. This is obviously due to the fact that the cream rises to the top of the can and leaves the milk to be drawn by means of the faucet at the bottom thereof first, and the cream last. It is also the custom in a great many restaurants to keep the milk in bottles, five gallon cans, and similar receptacles, thus compelling the waiters to resort to a manual shaking or stirring of the milk before it is served to the customers.

The object of my invention is to overcome the foregoing inherent disadvantages by providing a mechanical device which will automatically and periodically agitate the milk.

To the accomplishment of the recited object and others subordinate therewith, the preferred embodiment of my invention resides in that construction and arrangement of parts hereinafter described, illustrated in the accompanying drawings, and embraced within the scope of the appended claim.

In said drawings:—Figure 1 is a side elevation of the mechanical device used for agitating the milk, a portion thereof being broken away for the purpose of more clearly illustrating the component parts, and Fig. 2 is a top plan view thereof. Fig. 3 is a side elevation showing the application of the device to a churn, the latter being partially broken away. Fig. 4 is a detail perspective view of the support for the churn-shaft, and Fig. 5 is a similar view of the dasher.

Referring more particularly to the drawings for a detail description of my invention, the numeral 1 designates a platform or top which is adapted to serve as a cover for the receptacle upon which the agitating device is to be used. Superposed with respect to the platform 1, and arranged preferably at the center thereof is a block 2, which together with the platform is vertically bored to accommodate the dasher-shaft 3, the latter extending upwardly beyond the top of said block and being journaled at its terminal in the horizontal arm 4 of the bracket 5. At a point intermediate the top of the block and the arm 4 of the bracket the shaft 3 has mounted thereon a pinion 6, which meshes with the worm 7 disposed in a plane at right angles thereto and formed as an integral portion of the shaft 8 which is suitably sustained by the bracket 9, also mounted upon the block 2, the outer end of the shaft 8 carrying a large pinion 10 adapted for engagement with the smaller pinion 11 of an electric motor 12.

To the right of the vertical shaft 3 is located a suitable clock-train and preferably inclosed in a casing, as 13. This mechanism involves essentially an hour pinion 14 and a smaller pinion 15 meshing therewith and provided with a radially extending arm 16 which is adapted to periodically engage the depending spring arm 17 having its upper extremity secured by screws 18 to the frame 19 of the clock mechanism.

The motor 12 has one of its terminals 20 connected to the wire 21 and its other terminal 22 connected to the wire 23, the wire 21 being suitably secured to the binding-post 24 of the clock-train, while the wire 23 is connected to dry batteries or any other desired source of current 25, and the opposite end to the binding-post 26 of the clock-train.

In operation, the platform or top 1 is placed upon the top of the milk can or receptacle, whereupon the clock mechanism is wound. The hour pinion, as the name implies, will rotate once every hour, and the smaller pinion 15 in mesh therewith is arranged to revolve four times as fast. Accordingly, as the hour pinion 14 rotates the smaller pinion 15 will be caused to revolve and the arm 16 carried thereby will engage the depending spring arm 17 four times as the said hour pinion revolves once. Owing to the resiliency of the spring arm and its disposition relatively to the rigid arm 16, the two arms will engage each other for about a minute or so every fifteen minutes. This closes the circuit and the motor 12 is energized to rotate the dasher 27 through the medium of the gears hereinbefore explained. The idea is that whenever the arms 17 and 16 engage, the milk is agitated for a short time and not sufficiently long to cause the formation of small particles of butter. If desired a cover, as 28, may be employed to inclose the hereinbefore described mechanism.

It will thus be seen that I have devised mechanism which will automatically maintain the milk and cream thoroughly and continually mixed, thus insuring each customer who orders milk his share of cream.

Obviously, my invention may be used to agitate liquids other than milk, which have a tendency to become separated.

I desire it understood that my invention is not limited in its application to the agitation of milk but may be used for insuring mixtures of any analogous liquids.

What is claimed, is:—

In a dispensing apparatus, the combination of a dispensing receptacle, a vertically disposed rotary shaft mounted therein, an agitating paddle fixed to the said shaft, and automatic means for intermittently rotating the shaft at regular intervals and at a uniform speed.

In testimony whereof I hereunto affix my signature in presence of two witnesses.

WILLIAM PIERCE TINSLEY.

Witnesses:
W. J. CAMPBELL,
P. R. PHILLIPS.